June 16, 1959  TEIZO KOHTAKI  2,890,656
PLUNGER PUMP ASSEMBLY
Filed May 2, 1956

INVENTOR.
TEIZO KOHTAKI
BY

United States Patent Office 2,890,656
Patented June 16, 1959

2,890,656

PLUNGER PUMP ASSEMBLY

Teizo Kohtaki, Numazu, Japan

Application May 2, 1956, Serial No. 582,284

Claims priority, application Japan May 21, 1955

4 Claims. (Cl. 103—5)

This invention relates to a device for balancing the pressure in a hydraulic pump and comprises a plunger pump assembly having a plurality of paired unit pumps cooperating with each other.

More particularly, this invention relates to an improvement in such a pressure balancing device, which is provided with a plunger pump assembly comprising a primary rotating shaft driven by suitable means, a secondary rotating shaft connected with said primary shaft through a differential gear, two cam or eccentric discs fixed to said shafts, respectively, two sets of plungers arranged radially to said discs and driven thereby, respectively, a common casing receiving said plungers and means for producing a restoring force acting on said differential gear, the phase of rotation of said secondary shaft being varied relatively to that of said primary shaft in response to change in discharge pressure of the plunger pump assembly, whereby the discharge amount of said assembly is changed inversely to the discharge pressure.

In the known pump assemblies of this kind, in order to avoid vibrations of the assembly due to changes in discharge pressure of the assembly, the means employed as a restoring force is a balancing device which is actuated by the discharge pressure of liquid by-passed from the discharge side of the assembly, and a spring resisting said discharge pressure which is operatively associated with the differential gear. A tightly sealed cylinder, which is part of the balancing device receiving a part of the discharged liquid of the assembly, however, is costly and liable to get out of order on account of an eventual extremely high discharge pressure of the assembly.

The main object of this invention, therefore, resides in the provision of a pump assembly of this kind with a balancing device wherein tightly sealed cylinder part is dispensed with, whereby the assembly is made small in space and simplified in construction, may be inexpensively produced and is reliable in operation.

In order to attain this object, according to this invention a rotary valve is provided which is made to rotate synchronously with the primary rotating shaft and whose rotating valve body has suction and delivery passages bored therein which are made to communicate with suction and delivery sides of the pump assembly, respectively.

In a typical embodiment of this invention, six units of the paired pumps are provided which are driven at a speed of more than 1,000 r.p.m. In this case, changes in load on the cam or eccentric disc on the secondary rotating shaft are of very short duration, so that a very good balance is effected by employing a spring to maintain said cam in a desired position relative to the other cam through the differential gear.

The accompanying drawing shows one embodiment of the plunger pump assembly according to this invention, wherein.

Figure 1:
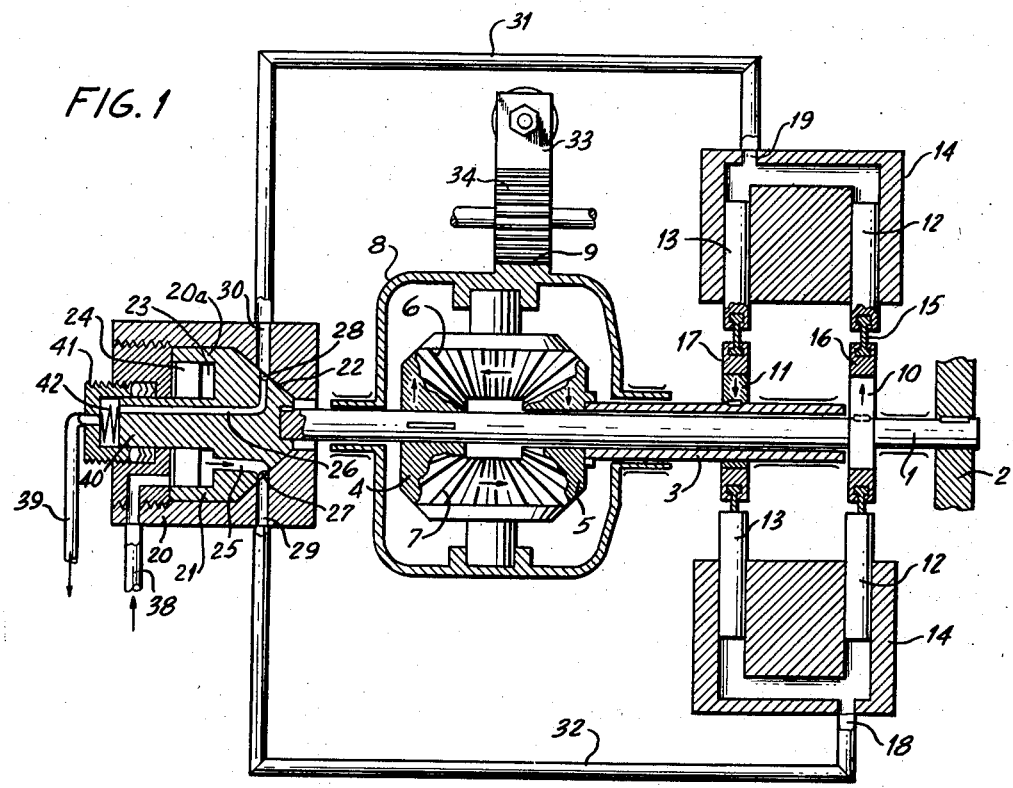
Fig. 1 is a schematic view of the embodiment, partly in section.
Figure 2:
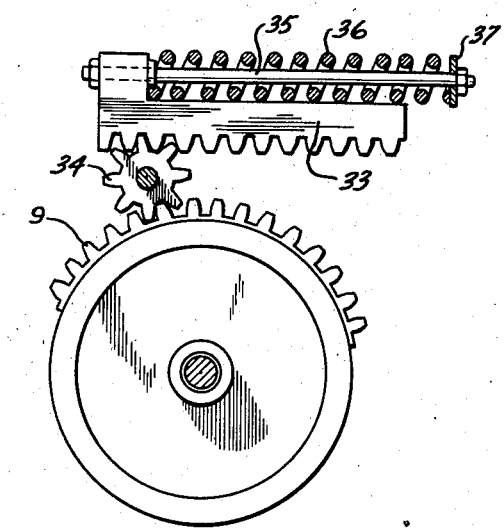
Fig. 2 is a front view of the differential gear and the balancing device.

In the drawing, 1 denotes a primary rotating shaft having a grooved pulley 2 keyed thereto and to be driven by a motor, e.g., an electric motor not shown in the drawing. This shaft 1 extends centrally through a hollow secondary rotating shaft 3 and carries fixedly a bevel gear 4, which as well as a bevel gear 5 fixed to the shaft 3 mesh with two bevel gears 6, 7, said gears forming a differential gear train. A differential gear casing 8 carrying the gears 6, 7 is mounted loosely on shafts 1 and 3 and provided externally with a segmental serration 9. 10 and 11 denote driving wheels, i.e., eccentric discs fixed to the shafts 1 and 3, respectively, while 12 and 13 denote plungers slidably inserted into a common pump housing 14 and arranged radially in relation to the discs 10 and 11, respectively. Each set of plungers 12 or 13 consists of six plungers in the embodiment shown, so that there are six units of paired pumps. The plungers 12, 13 are connected by connecting pieces 15 with straps 16, 17 of the eccentric discs 10, 11, respectively, whereby the plungers reciprocate in accordance with rotation of the eccentric discs. Each adjacent unit of the paired pumps has its common port 18 or 19 which communicates with a rotary valve. This rotary valve consists mainly of a valve casing 20 which also contains pump housing 20a and a valve body 21 fitted rotatably in said casing 20, and connected integrally with the primary shaft 1. The pump housing 20a is provided at its front end with a recess 23 in which a bladed screw type runner wheel 24 having conventionally angularly disposed blades of a rotary pump coaxial with the valve body 21 is arranged. It is particularly noted that pumping action occurs between the stationary valve casing 20 and the runner wheel 24, since recess 23 is formed in the valve casing 20. The valve body 21 is provided in the axial direction with a suction passage 25 and a discharge passage 26 smaller in cross section than the suction passage 25. The passages 25 and 26 communicate with arcuate ports 27 and 28 in the conical contact surface 22 extending over about 160°, respectively, and these ports 27 and 28 are adapted to communicate in turn with radial passages 29 and 30 in the valve casing 20, the radial passages 29 and 30 being connected with the ports 18 and 19 in the pump housing 14 through pipes 31 and 32, respectively. In the drawing there are shown only two units of the paired pumps, but in fact, as mentioned above, six plungers are disposed radially around each eccentric disc and the number of plungers may be varied as desired.

A rack 33 slidably carried on the assembly frame, not shown, engages with the serration 9 on the gear casing 8 through a pinion 34 suitably supported by the assembly frame. A spring 36 is wound around a bolt 35 fixed to the rack 33 and interposed between said rack 33 and a stationary spring support plate 37. The elastic strength of this spring determines the maximum discharge pressure of the pump assembly.

When pressure in the pump chamber, for example, increases above a predetermined value, the eccentric disc 11 performs a relative motion to the eccentric disc 10 through the differential gear assembly 4, 5, 6, 7, 8 and 9, that is, the differential gear casing 8 rotates relatively to the shaft 1 with the result that the rack 33 meshing with the serration 9 of the casing 8 is shifted accordingly.

When the assembly is put in operation, a liquid from a suitable liquid source is sucked into the rotary valve by the rotary pump through pipe 38 and then delivered to the suction side of the pump assembly through the suction passage 25, the port 29 and the pipe 31. This liquid is then pumped by the plungers to the discharge side of the pump assembly and discharged through pipe 32 to the rotary valve. From the valve the liquid is discharged through the discharge passage 26 into pipe 39.

Between the rear end of the rotary pump shaft 40 and the connecting piece 41 there is interposed a helical spring 42 which serves, together with the liquid discharged, to press the valve body 21 against the casing 20.

When the primary shaft has rotated about one half revolution from the position shown in the drawing, the suction passage 25 of the valve body 21 comunicates with the suction side of the pump assembly through pipe 32 and port 19 while the discharge passage 26 of the valve body communicates with the discharge side of the pump assembly through the piping 31 and port 18.

In the pump assembly shown, the primary and secondary shafts rotate exactly synchronously with the minimum discharge pressure and maximum discharge quantity of the pump assembly. When the discharge pressure is gradually increased, the resisting pressure acting on the plungers is likewise gradually increased, with the result that the secondary shaft, i.e., the eccentric disc 11 thereon rotates at a retarded speed relative to the primary shaft, i.e., the eccentric disc 10, against the force of the balancing spring 36, whereby the phase of the stroke of the valve plungers 13 of the paired unit pumps becomes different from that of valve plungers 12. When, however, each plunger 13 performs its suction stroke, the resisting pressure exerted on the eccentric disc 11 decreases temporarily and the casing 8 tends to restore its original position through the balancing spring 36.

According to this invention, however, due to the exact cooperation of the rotary valve with the pump assembly of the vibration damping device, resulting from the provision of several paired unit pumps, as well as from the high operational speed of the assembly, load changes on the eccentric disc 11 on the secondary shaft 3 as mentioned above are of very short duration, so that practically no destructive vibrations take place in the pump assembly.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A pump assembly for a working fluid comprising a motor, a primary rotatable shaft in driving relation with said motor, differential gear means, a secondary rotatable shaft connected with said primary shaft through said differential gear means, two cam means fixed to said shafts, respectively, two sets of plungers operatively connected and extending radially to said cam means to be driven thereby, respectively, a high pressure pump containing said plungers, means connected to said differential gear means for producing a restoring force acting on said differential gear means, the phase of rotation of said secondary shaft being varied relative to that of said primary shaft in response to change in fluid discharge pressure of the pump assembly, whereby the fluid discharge amount of said assembly is changed inversely to the fluid discharge pressure, a valve body having conduits in fluid communication with said high pressure pump, a rotatable valve mounted in said valve body and synchronously rotatable with said primary shaft, said rotatable valve having said delivery passages communicatable with suction and conduits, respectively, and a low pressure pump including a member connected to and rotatable with said valve and in communication with the suction passage of said valve.

2. A device for balancing the pressure in a hydraulic pump; comprising a first rotatable shaft, a second rotatable shaft, differential gear means operatively connecting both said shafts, a housing for said differential gear means, first cam means, second cam means, said cam means being spaced from each other and secured to the corresponding shaft, a first pump housing at one side of said differential gear means having a delivery inlet and a discharge outlet for a working fluid medium, a first pair of radially extending pump plungers operatively engaged by said first cam means and arranged opposite each other, a second pair of pump plungers operatively engaged by said second cam means and arranged opposite to each other and extending radially to said shafts, one of each of said first and second pairs of pump plungers communicating with said delivery inlet, the other of each of said first and second pairs of pump plungers communicating with said discharge outlet, a second pump housing arranged at the other side of said differential gear means and having a delivery channel and a discharge channel communicating with said delivery inlet and discharge outlet, respectively, of said first pump housing, a rotatable valve in said second pump housing secured to said first shaft and provided with passages for alternately communicating with said channels in said second pump housing, a rotary pump in said second pump housing next to said rotatable valve and adapted to communicate with said passages of said rotatable valve, said rotary pump having an intake port and a discharge port, peripheral gear means provided on said housing for said differential gear means, a slidable spring-loaded rack engaging with said peripheral gear means for absorbing vibrations of said rotary pump during operation thereof and when the pressure of said working fluid medium exceeds a predetermined value, whereby the working fluid medium enters said intake port of said rotary pump and is conducted through the delivery channel of said pump via said valve passage from the discharge outlet to said delivery inlet of said first pump housing, whence the working fluid is urged through said first pump housing into the discharge outlet thereof via the discharge channel of said second pump housing and through the passage of said rotatable valve to said discharge port of said rotary pump.

3. A device according to claim 2, wherein a pinion is interposed between said peripheral gear means and said slidable spring-loaded rack, said pinion being in mesh with said peripheral gear means and said slidable spring-loaded rack.

4. A device according to claim 3, wherein said spring-loaded rack includes a support, a coil spring secured to said support, and a rod secured to said rack and extending through said coil spring longitudinally of said rack.

References Cited in the file of this patent

UNITED STATES PATENTS

| 1,719,693 | Ernst | July 2, 1929 |
| 1,924,423 | Svenson | Aug. 29, 1933 |
| 2,172,103 | Kotaki | Sept. 5, 1939 |
| 2,356,993 | Glasner et al. | Aug. 29, 1944 |
| 2,381,910 | Joy | Aug. 14, 1945 |

FOREIGN PATENTS

| 896,913 | Germany | Nov. 16, 1949 |